Patented Dec. 17, 1940

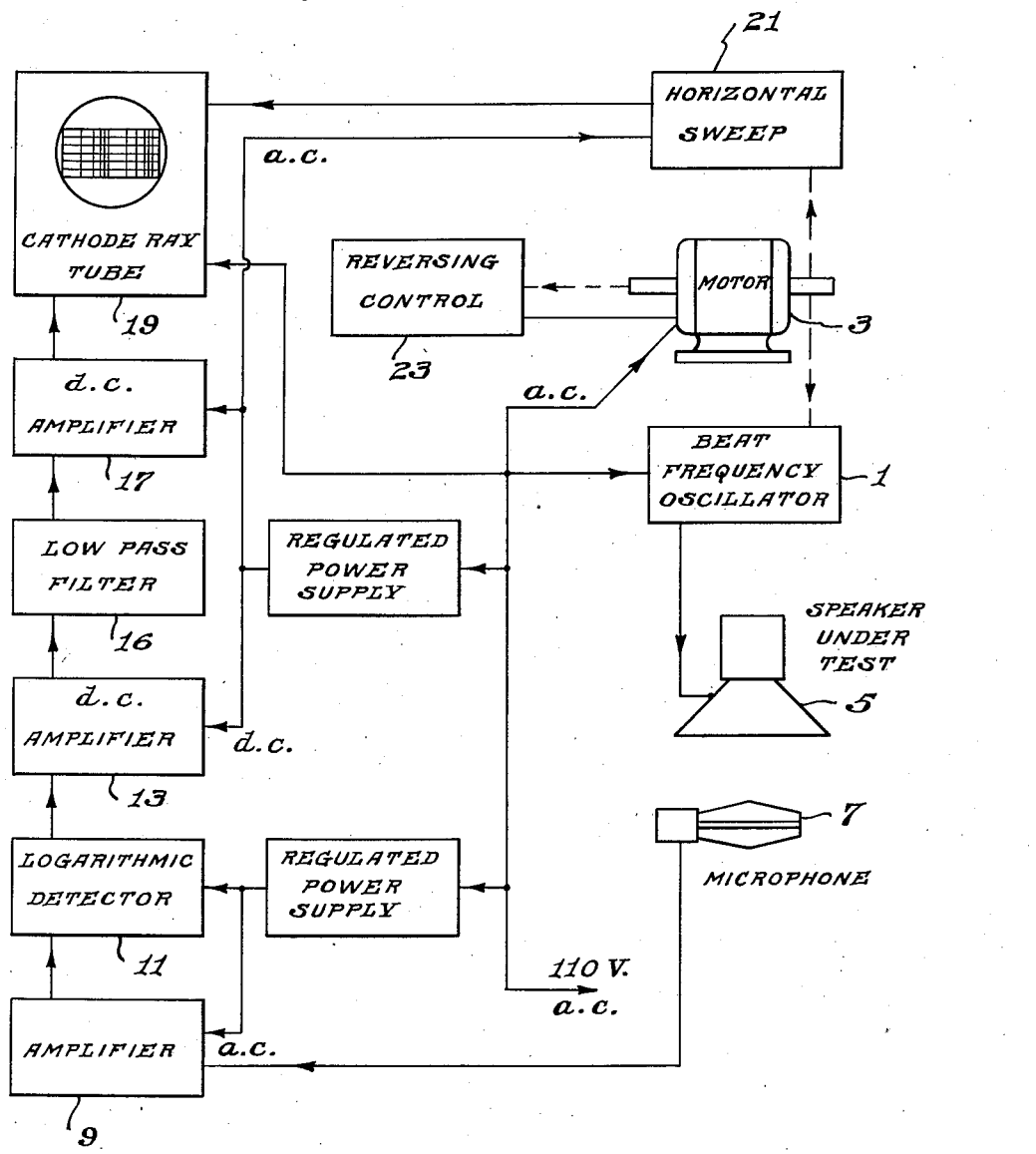

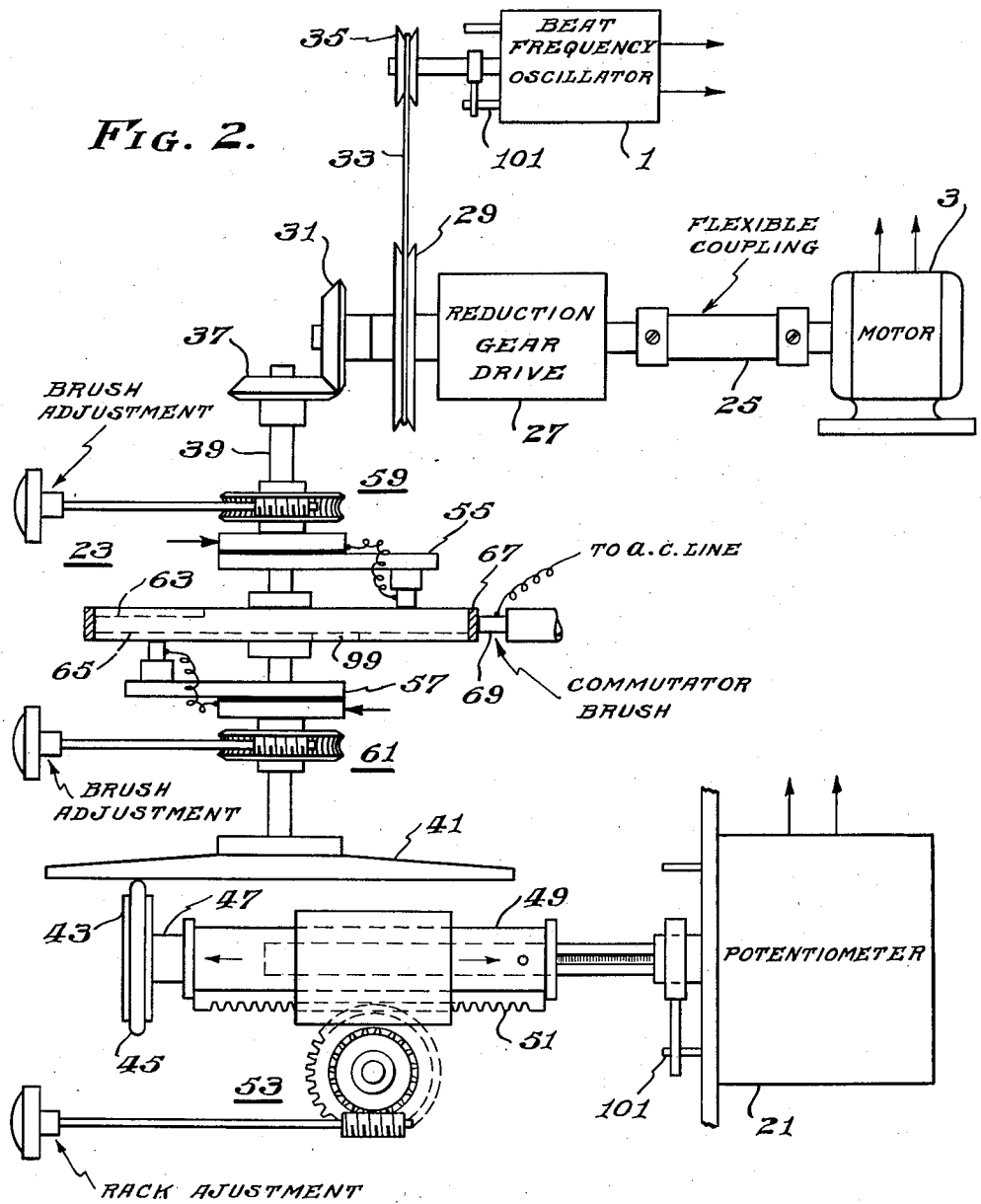

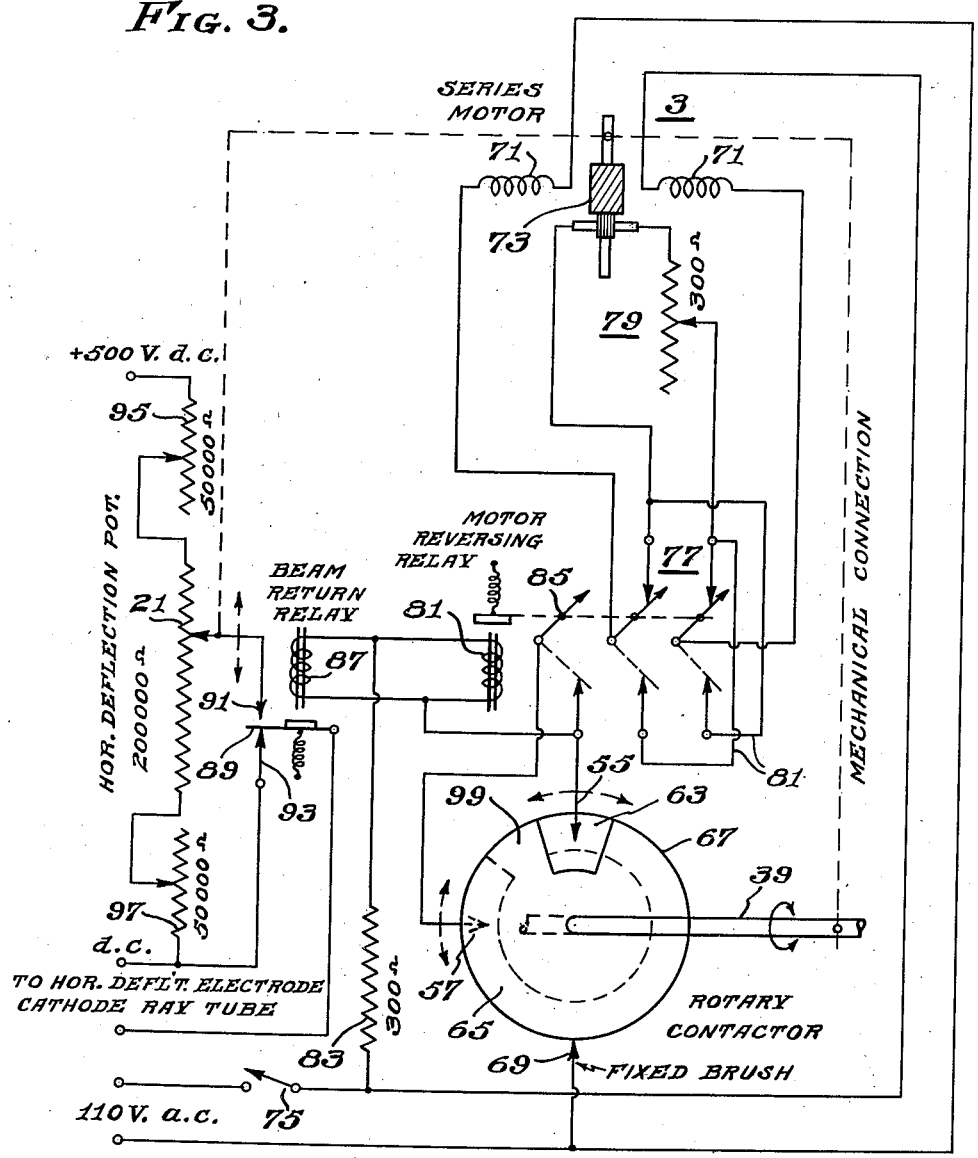

2,224,909

UNITED STATES PATENT OFFICE 2,224,909

ACOUSTIC DEVICE

Reginald A. Hackley, Bala-Cynwyd, Pa., assignor to Radio Corporation of America, a corporation of Delaware Application July 27, 1939, Serial No. 286,752

8 Claims. (Cl. 179—175.1)

This invention relates to acoustic devices and more particularly to a cathode ray high speed recorder for making acoustic measurements.

In acoustic work, it is highly desirable to study response as a function of frequency to determine the performance of an acoustical device. Numerous recording systems have been developed. While it has been proposed to use a cathode ray oscillograph, it was found that the trace had to be repeated sufficiently rapid to give an appearance of a stationary image. This rate of repetition was determined by the retentivity of the cathode ray tube screen. In view of the fact that the retentivity of a conventional screen was only a fraction of a second, it was necessary to have an extremely high scanning rate. This, in turn, brought about the difficulty that as the low frequency portion of the response curve, the trace followed the form of the individual partial cycles of the driving voltage rather than being made up of a plurality of points which were the resultant of several complete cycles.

One of the objects of this invention is to provide means for overcoming the aforementioned difficulty. Another object is to provide an acoustic recording device in which a cathode ray tube with a persistent screen is used whereby a single trace can be observed for several minutes. A further object is to provide an acoustical recording device in which the scanning rate is low enough so that each point on the trace represents the resultant of several complete sound cycles. A further object of this invention is to provide means in an acoustical recording device whereby any desired portion of a frequency response curve may be traced on a persistent screen of a cathode ray tube.

The invention will be described by referring to the accompanying drawings in which Figure 1 is a schematic representation of one embodiment of the invention; Figure 2 is a detailed plan view of one of the elements of the invention; and Figure 3 is a schematic circuit diagram of the motor reversing device and switching circuit employed in the invention. Similar reference numerals will be used to indicate similar elements in the several drawings.

Referring to Fig. 1, a beat frequency oscillator 1, the frequency control of which is rotated by a motor 3, is connected to the loudspeaker 5 under test. A microphone or other suitable pickup device 7 is suitably placed to receive the sound waves emanating from the loudspeaker. The microphone output is connected to an amplifier 9. The amplifier output is applied to a logarithmic detector 11. The output from the detector 11 is impressed upon a D. C. amplifier 13. The output of the D. C. amplifier is connected through a low pass filter 15 to a D. C. amplifier 17. The output of the D. C. amplifier is connected to the vertical deflecting electrodes of a cathode ray tube 19, which includes a screen having a retentivity of several minutes. The horizontal deflecting electrodes of the cathode ray tube are connected to a horizontal voltage sweep source 21 which is driven by the motor 3. The motor also operates a reversing control means 23.

In the operation of the foregoing device, beat frequency currents, beginning, for example, at the lowest audio frequency and gradually increasing to the highest audio frequency, are applied to the loudspeaker 5. Thus, the speaker is energized throughout the desired frequency range. At the same time that the frequency is increased, voltages from the horizontal sweep source are applied to the cathode ray tube to deflect the ray as a function of the frequency applied to the speaker. The speaker radiates sound waves which actuate the microphone to establish thereby voltages corresponding to the sound waves.

These voltages are amplified and detected. The detector is preferably arranged so that the output voltage varies logarithmically with the input voltage. This is desirable because the input amplitude variations will then be indicated in decibels. The detector output may be amplified to any desired degree and since this output will include, in addition to the direct current component, a double frequency of the alternating current component, it is desirable to remove the alternating current component which is done by means of the low pass filter. The time constant of the filter is made low enough to pass the amplitude variations in the direct current component result from the variations in the acoustical output of the loudspeaker.

The final direct current component, after further amplification, is applied to deflect vertically the cathode ray. The resulting movements of the cathode ray establish a trace on the cathode ray tube screen which is persistent enough to retain the image for several minutes. Furthermore, as will hereinafter appear, the trace may be repeated to prevent the image from dying out. The trace may be observed visually, photographically, or preserved in graphic form by suitable pencil or ink tracing.

While the majority of the elements of the foregoing device are known to those skilled in the art, a more detailed description of the frequency sweep and motor reversing circuits will be helpful. Referring to Fig. 2, the motor 3 is connected through a suitable flexible coupling 25 to a reduction gear drive 27. The reduction gear drive operates a pulley 29 and a bevel gear 31. The pulley is connected by means of a belt 33 to a second pulley 35 which is mounted on the control shaft of the beat frequency oscillator 1. The bevel gear 31 engages a second bevel gear 37 which is mounted on one end of a shaft 39; the other end of the shaft is connected to a friction drive plate 41. A suitable pinion wheel 43, preferably including a rubber tire 45, engages the drive plate 41. The pinion wheel is mounted on a shaft 47 which is coupled to the potentiometer or horizontal sweep device 21. The coupling includes a slidable member 49 which carries a rack 51. The rack is moved back and forth by means of a gear and worm 53. The position of the pinion wheel 43 on the driving plate 41 determines the ratio of movement of the beat frequency oscillator control shaft with respect to the potentiometer shaft.

Intermediate the second bevel gear and the friction drive plate is disposed a reversing control 23. This control includes a pair of movable brush holders 55—57. These brush holders are adjusted respectively by means of worm and gear devices 59—61. The brushes engage a commutator which is composed of two segments, one of the segments 63 covers approximately 40 degrees; the other segment 65 covers approximately 320 degrees. The two aforementioned commutator segments are connected together by means of a third segment 67 which covers 360 degrees. A fixed brush 69 engages the 360 degree commutator segment. As will hereinafter appear, the movable brush holders 55—57 may be adjusted with respect to each other so that any desired range of beat frequencies may be obtained from the oscillator 1.

The details of the motor reversing control and the horizontal deflection potentiometer are shown in Fig. 3. The motor 3 is preferably a series wound motor which may be readily reversed by reversing its field coil 71 with respect to its armature 73. The armature is coupled, as already described, to the potentiometer 21 and to the shaft 39 wichh operates the commutator 63—65—67. The fixed brush 69 is connected to one terminal of the 110 volt A.-C. line. The other terminal of the line is connected through the switch 75 to one of the field windings which is terminated at a fixed contact of a relay 81 operated double pole-double throw switch 77. The other fixed contact of the D. P. D. T. switch is connected to the other field winding. The upper two contacts of the switch 77 are connected to the armature 73 through a rheostat 79. The lower fixed contacts of the switch 77 are also connected to the armature 73 but in a reverse sense by a reversal of the leads 81.

To prevent premature reversing of the driving motor 3, the motor reversing relay 81 is connected as follows: One of the relay terminals is connected through a resistor 83 to one side of the 110 volt A.-C. line. The other terminal of the line is connected through a fixed brush 69 and through one of the movable brushes 55 which is also connected through an auxiliary switch contact 85 to the other movable brush 57.

To prevent the cathode ray from retracing the resultant curve, a beam return relay 87 is employed. This relay is connected in parallel with the motor reversing relay 81. The beam return relay includes a movable contact arm 89 and a pair of fixed contacts 91—93. The operation of the relay 87 applies a potential which immediately restores the cathode ray beam to its original position. The original position incidentally is adjusted by means of a pair of rheostats 95—97 which are connected in series with either fixed terminal of the potentiometer 21. This adjustment permits centering the trace on the cathode ray screen. A direct current, preferably of the order of 500 volts, is applied to the rheostats 95—97 and the potentiometer 21.

The operation of the foregoing reversing control and horizontal sweep circuit is as follows: If the switch 75 is closed, the relay 81 will be energized, closing the auxiliary switch 85, and current will be applied to the motor which will start rotating and will continue to rotate until the brush 57 engages the insulated portion 99 of the commutator. At this point, the motor reversing relay will be deenergized and will open the auxiliary switch 85 as well as reverse the D. P. D. T. switch 77. At the same time the motor will reverse its direction of movement, and will continue to rotate until the motor reversing relay is again energized by the connection of the brush 55, thus completing the cycle. When the motor reversing relay 81 is energized, the beam return relay is also energized, thereby applying the horizontal deflecting voltage to the horizontal deflecting electrodes of the cathode ray tube. When the motor reversing relay is de-energized, the movable contact 89 of the beam return relay 87 engages the fixed contact 93 and thereby returns the beam to its original position. As thus arranged, the horizontal deflections of the cathode ray are always traced from the lowest initial voltage to the highest final voltage corresponding to the lowest frequency of the oscillator to the highest frequency. This type of movement overcomes all the difficulties of back-lash and permits substantially exact retracing of any graph. Furthermore, the adjustment of the relative positions of the movable brushes 55—57 provides a means for determining the range of beat frequencies obtained. As previously explained, the rack adjustment of the movable pinion wheel determines the sweep range of the cathode ray. Thus arranged, the device may be used to explore either the entire range of audio frequencies or any portion thereof, or a desired portion may be explored over the entire sweep circuit. Synchronization of the beat frequency oscillator control and the potentiometer, or sweep control is accomplished by employing stops 99.

I claim as my invention:

1. In an acoustic device, a cathode ray tube including a persistent screen and beam deflecting means, a source of current of variable frequency, means for deflecting the beam of said cathode ray tube along one coordinate in synchronism with said variation in one direction and for returning said beam rapidly in the other direction, means for applying said variable currents to an object to be tested to thereby establish sound waves, means responsive to said sound waves for converting said waves into electrical energy, and means for applying said energy to deflect said beam along another coordinate.

2. In an acoustic device, a cathode ray tube including a persistent screen and beam deflecting means, a source of current of variable frequency, means for deflecting the beam of said cathode ray tube along one coordinate in synchronism with said variation in one direction and for returning said beam rapidly in the other direction, means for applying said variable currents to an object to be tested to thereby establish sound waves, means responsive to said sound waves for converting said waves into electrical energy bearing a logarithmic relation to the sound, and means for applying said energy to deflect said beam along another coordinate.

3. In a device of the character of claim 1, a filter for removing undesired components established by the conversion of said sound energy into said applied electrical energy, said filter having a time constant which does not substantially modify the desired components.

4. In a device of the character of claim 1, means for selecting any desired band of variable frequency currents, and means for adjusting and synchronizing said beam deflecting means so that said deflections along said one direction may be made to correspond to the selected band.

5. In an acoustic device, a source of current of variable frequency, a motor, means coupling said motor to said source so that said frequency may be varied thereby, a reversing switch connected to said motor, means for operating said switch, a commutator driven by said motor, a pair of brushes relatively adjustably engaging said commutator and connected to said switch operating means, and means for limiting the operation of said switch operating means to a function of said relative brush adjustment.

6. In an acoustic device, a cathode ray tube including beam deflecting means, a source of current of variable frequency, a motor, means coupling said motor to said source so that said frequency may be varied thereby, a reversing switch connected to said motor, means for operating said switch, a commutator driven by said motor, a pair of brushes relatively adjustably engaging said commutator and connected to said switch operating means, means for limiting the operation of said switch operating means to correspond to the relative adjustment of said brushes, and a sweep voltage circuit connected to said beam deflecting means and operated by said motor.

7. In an acoustic device, a cathode ray tube including beam deflecting means, a source of current of variable frequency, a motor, means coupling said motor to said source so that said frequency may be varied thereby, a reversing switch connected to said motor, means for operating said switch, a commutator driven by said motor, a pair of brushes relatively adjustably engaging said commutator and connected to said switch operating means, means for limiting the operation of said switch operating means to correspond to the relative adjustment of said brushes, a sweep voltage circuit connected to said beam deflecting means and operated by said motor, and means for adjusting said sweep independently of said frequency variation so that any portion of the sweep voltage may be applied to the beam deflecting means.

8. In a device of the character of claim 6, a pair of adjustable resistors serially connected to the respective terminals of said sweep voltage circuit for centering the beam of said tube.

REGINALD A. HACKLEY.